United States Patent
Chen (10) Patent No.: US 12,095,636 B2
(45) Date of Patent: Sep. 17, 2024

(54) OPTIMIZATION METHOD AND SERVER THEREOF

(71) Applicant: Wistron Corporation, New Taipei (TW)

(72) Inventor: Chih-Ming Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 17/869,764

(22) Filed: Jul. 20, 2022

(65) Prior Publication Data
US 2023/0344730 A1    Oct. 26, 2023

(30) Foreign Application Priority Data
Apr. 26, 2022    (TW) .................................. 111115835

(51) Int. Cl.
*G06F 15/177* (2006.01)
*H04L 41/0823* (2022.01)
*H04L 43/045* (2022.01)

(52) U.S. Cl.
CPC ........ *H04L 43/045* (2013.01); *H04L 41/0823* (2013.01)

(58) Field of Classification Search
CPC .......................... H04L 43/045; H04L 41/0823
See application file for complete search history.

(56) References Cited

U.S. PATENT DOCUMENTS

| | | | | |
|---|---|---|---|---|
| 2007/0011211 A1* | 1/2007 | Reeves | ................. | G06F 40/194 |
| | | | | 707/999.203 |
| 2021/0142197 A1* | 5/2021 | Katz | ........................ | G06N 7/01 |
| 2021/0351973 A1* | 11/2021 | Ford | .................. | H04L 41/0631 |
| 2022/0043887 A1 | 2/2022 | Feng | | |

FOREIGN PATENT DOCUMENTS

CN         114385487 A         4/2022

OTHER PUBLICATIONS

NPL1: A Bayesian Approach for Estimating Causal Effects from Observational Data in AAAI Conference on AI, 2020 (Year: 2020).*
NPL2: Learning Causal Semantic Representation for Out-of-Distribution Prediction, Conference on Neural Information Processing Systems (NeuroIPS 2021) (Year: 2021).*

* cited by examiner

Primary Examiner — Padma Mundur
(74) Attorney, Agent, or Firm — Winston Hsu (57) ABSTRACT

An optimization method includes generating a constrained causal graph according to an observation data received from a distributed unit, performing a finite domain representation planning using the constrained causal graph to generate an action data about a plurality of radio unit parameters after optimization, and outputting the action data to the distributed unit. A number of a plurality of causal variables of the constrained causal graph and a causal structure of the constrained causal graph are determined at a time.

18 Claims, 6 Drawing Sheets

OPTIMIZATION METHOD AND SERVER THEREOF

BACKGROUND OF THE INVENTION

1. Field of the Invention

The present invention relates to an optimization method and a server thereof, and more particularly, to an optimization method and a server thereof which improve the efficiency and accuracy of setting radio unit parameters.

2. Description of the Prior Art

Different vendors may implement radio units and distributed units in different ways, rendering integration between radio units and distributed units from different vendors or multivendor interoperability difficult or impossible. In 5th generation mobile networks (5G) user scenarios, when a radio unit of one vendor is to be connected to a distributed unit of another vendor, radio unit parameters listed in working group 4 (WG4) interoperability testing (IOT) are set to the distributed unit manually, which is very time consuming and error prone.

For example, when a radio unit and a distributed unit are from the same vendor, the radio unit and the distributed unit are matched in terms of when to send signal(s) and when to receive signal(s). However, for a radio unit and a distributed unit come from different vendors, in order to support the coordination of the timing of the control plane (C-plane) and the user plane (U-plane), the open radio access network (O-RAN) interface specifies that control plane message(s) must arrive at the radio unit some amount of time (e.g., according to Tcp_adv_dl listed in Table 1) in advance of the latest possible time the user plane message(s) may arrive. Since the interface between a radio unit and a distributed unit is very latency-sensitive, radio unit parameters must be set correctly to achieve tight synchronization between the radio unit and the distributed unit.

Therefore, there is still room for improvement when it comes to the efficiency and accuracy of setting radio unit parameters.

SUMMARY OF THE INVENTION

It is therefore a primary objective of the present invention to provide an optimization method and a server thereof to improve the efficiency and accuracy of setting radio unit parameters.

An embodiment of the present invention discloses an optimization method comprising generating a constrained causal graph according to observation data received from a distributed unit, wherein a number of a plurality of causal variables of the constrained causal graph and a causal structure of the constrained causal graph are determined together; performing finite domain representation planning using the constrained causal graph to generate action data related to a plurality of radio unit parameters optimized; and outputting the action data to the distributed unit.

An embodiment of the present invention discloses a server comprising a storage circuit configured to store instructions, and a processing circuit coupled to the storage device and configured to execute the instructions stored in the storage circuit. The instructions comprise generating a constrained causal graph according to observation data received from a distributed unit, wherein a number of a plurality of causal variables of the constrained causal graph and a causal structure of the constrained causal graph are determined together; performing finite domain representation planning using the constrained causal graph to generate action data related to a plurality of radio unit parameters optimized; and outputting the action data to the distributed unit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
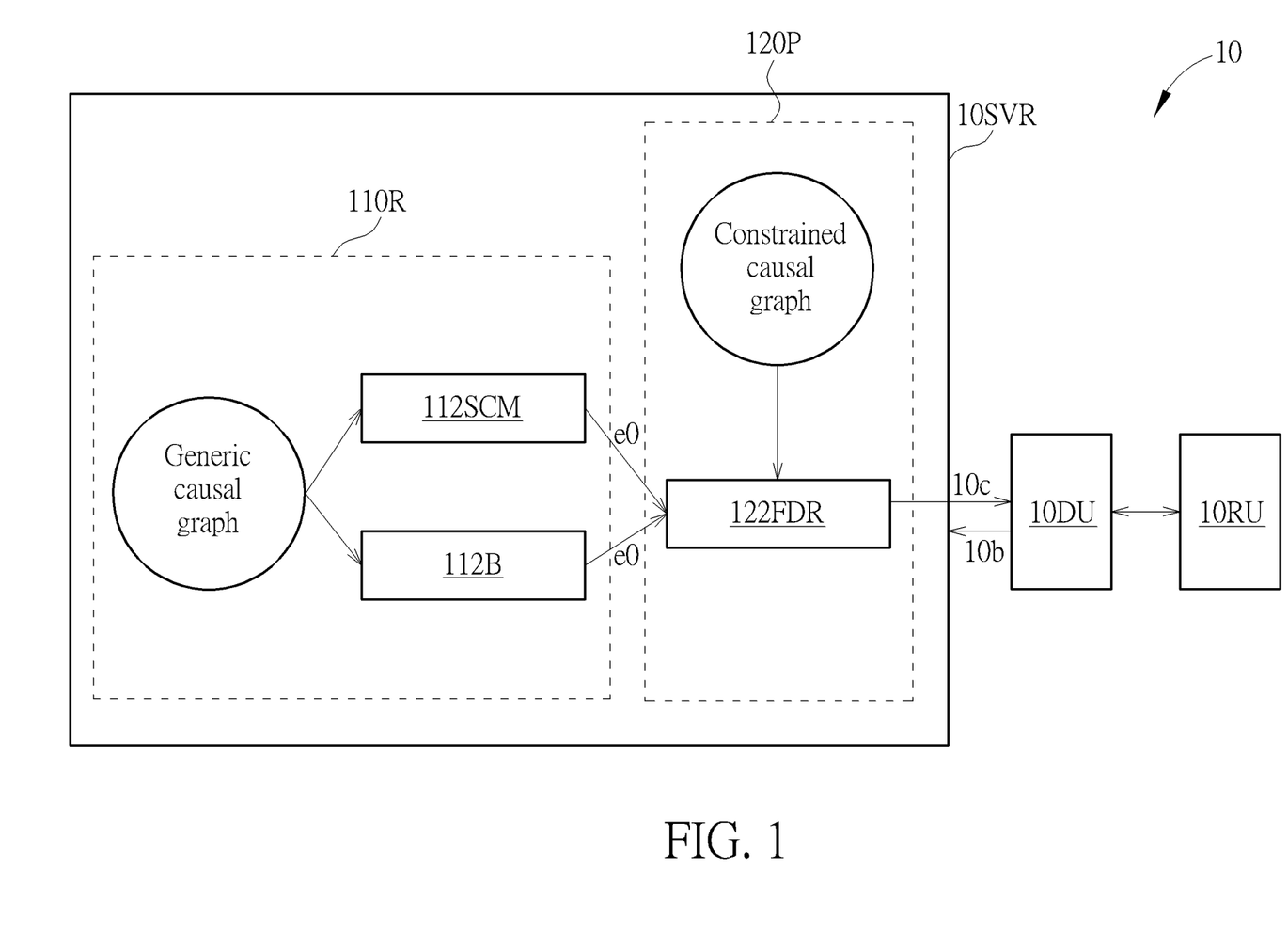
FIG. 1 is a schematic diagram of a communication system according to an embodiment of the present invention.

FIG. 1 is a schematic diagram of a communication system 10 according to an embodiment of the present invention. The communication system 10 may include a server 10SVR, a distributed unit (DU) 10DU, and a radio unit (RU) 10RU.

In one embodiment, the distributed unit 10DU and the radio unit 10RU may come from different vendors. When a radio unit 10RU of one vendor is to be connected to a distributed unit 10DU of another vendor, the server 10SVR may choose the most possible/optimized radio unit parameters (e.g., determine the most feasible/optimized value for each radio unit parameter) using an algorithm (e.g., an optimization method 20 shown in FIG. 2) to avoid the inefficiency and high error rate of manually applying radio unit parameters (i.e., parameters for the radio unit 10RU) on the distributed unit 10DU. The chosen radio unit parameters may thus be set in the distributed unit 10DU optimally.

Figure 2:
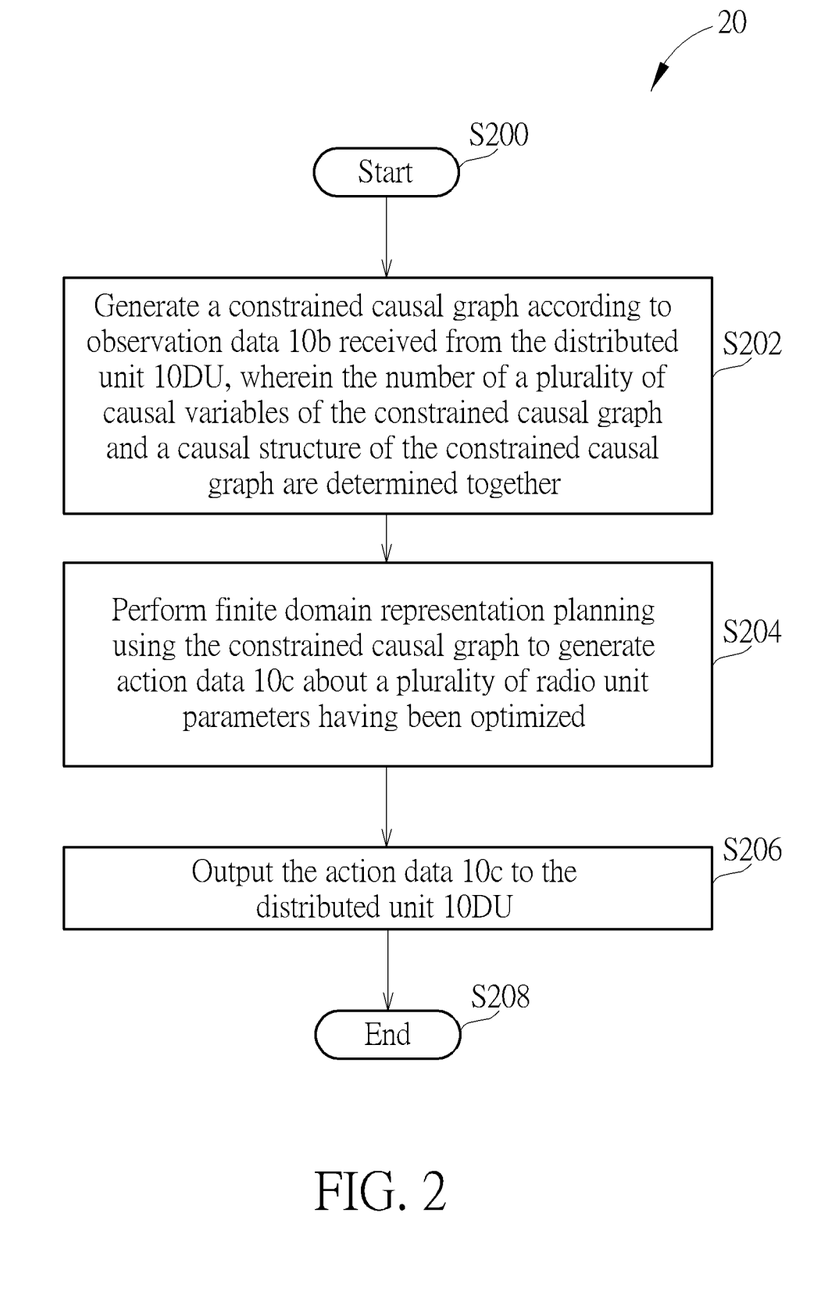
FIG. 2 is a flowchart of an optimization method according to an embodiment of the present invention.

Please refer to FIG. 2. FIG. 2 is a flowchart of the optimization method 20 according to an embodiment of the present invention. The optimization method 20 may be compiled into a code, which may be executed by a processing circuit and stored in a storage circuit. The steps of the optimization method 20 are as follows:

Step S200: Start.

Step S202: Generate a constrained causal graph according to observation data 10b received from the distributed unit 10DU, wherein the number of a plurality of causal variables of the constrained causal graph and a causal structure of the constrained causal graph are determined together.

Step S204: Perform finite domain representation planning using the constrained causal graph to generate action data 10c about a plurality of radio unit parameters having been optimized.

Step S206: Output the action data 10c to the distributed unit 10DU.

Step S208: End.

In FIG. 1, the server 10SVR may include a causal reasoning module 110R and a causal planning module 120P. Steps S202 to S206 in FIG. 2 may be performed by the causal planning module 120P.

In step S202, the causal planning module 120P may receive the observation data 10b from the distributed unit 10DU. The observation data 10b may be related to a description of system or network performance. In one embodiment, the observation data 10b may be a log file of the distributed unit 10DU. In one embodiment, the causal planning module 120P may convert the observation data 10b into grounding data.

In step S202, the causal planning module 120P may derive/obtain the constrained causal graph from the grounding data. The causal planning module 120P may choose a causal model for optimization based on maximum a posterior (MAP) and point estimation. Accordingly, causal variables of the constrained causal graph (or the number of the causal variables) and a causal structure of the constrained causal graph are determined/found/created together (at a time or in one go). Deciding the causal variables and the causal structure simultaneously may avoid problems incurred by deciding first causal variables and then a causal structure.

Figure 3:
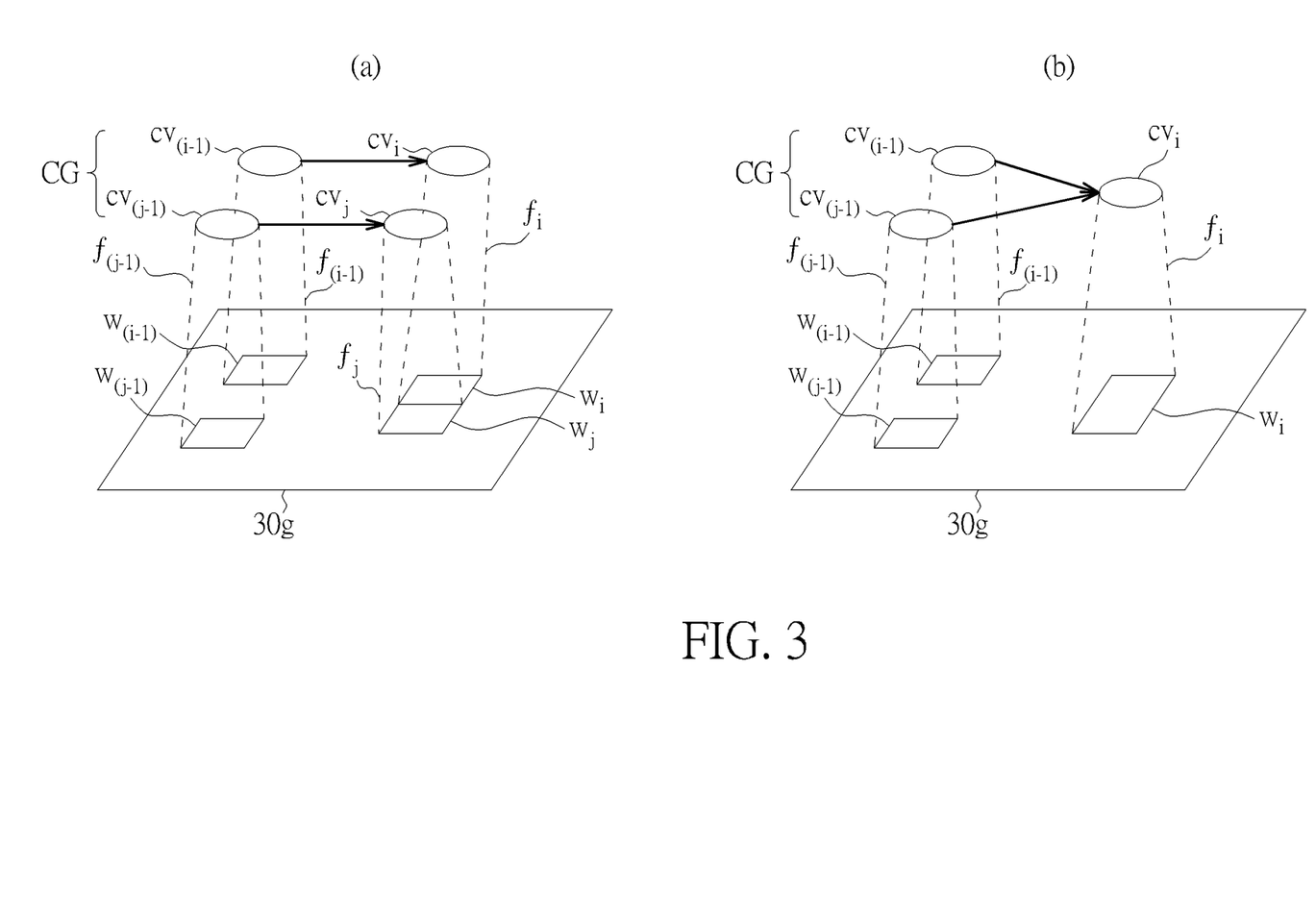
FIG. 3 is a schematic diagram of grounding data and part of a causal graph according to an embodiment of the present invention.

For example, FIG. 3 is a schematic diagram of grounding data 30g and part of a causal graph CG according to an embodiment of the present invention. In FIG. 3, (a) and (b) respectively illustrate two possibilities of the grounding data 30g and the causal graph CG. The causal graph CG may serve as a constrained causal graph for the optimization method 20. In FIG. 3, a causal structure of the causal graph CG may present the relationship between causal variables $cv_{(i-1)}$, $cv_i$, $cv_{(j-1)}$, and $cv_j$. Observation functions $f_{(i-1)}$, $f_i$, $f_{(j-1)}$, and $f_j$ may be used to map data $w_{(i-1)}$, $w_i$, $w_{(j-1)}$, and $w_j$ of the grounding data 30g to the causal variables $cv_{(i-1)}$, $cv_i$, $cv_{(j-1)}$, and $cv_j$ so as to provide the relationship between the causal variables $cv_{(i-1)}$, $cv_i$, $cv_{(j-1)}$, and $cv_j$ and the data $w_{(i-1)}$, $w_i$, $w_{(j-1)}$, and $w_j$ of the grounding data 30g. The causal variables $cv_{(i-1)}$, $cv_i$, $cv_{(j-1)}$, and $cv_j$ are defined/selected according to user scenario between the distributed unit 10DU and the radio unit 10RU. In one embodiment, the causal variables $cv_{(i-1)}$, $cv_i$, $cv_{(j-1)}$, and $cv_j$ may be manually/artificially defined (e.g., provided by experts). Here, i and j are positive integers.

In step S202, the causal planning module 120P may maximize a posterior probability $P(f_i, C|w_i)$ of assigning the data $w_i$ of the grounding data 30g to the observation function $f_i$ and the causal structure of the causal graph CG so as to determine/derive the corresponding causal structure and the corresponding causal variable $cv_i$ based on the data $w_i$ of the grounding data 30g. Accordingly, inference of the causal model may be described by combining Bayesian network (e.g., for the causal structure) with the observation functions $f_{(i-1)}$, $f_i$, $f_{(j-1)}$, and $f_j$. It is noteworthy that the causal variables $cv_{(i-1)}$, $cv_i$, $cv_{(j-1)}$, and $cv_j$ and the causal structure of the causal graph CG are obtained/determined together (namely, the causal variables cv(i−1), cvi, cv(j−1), and cvj are learned along/together with the causal structure), so the causal variables $cv_{(i-1)}$, $cv_i$, $cv_{(j-1)}$, and $cv_j$ and the causal structure may interact/affect/constrain each other.

In one embodiment, the posterior probability $P(f_i, C|w_i, Int)$ may satisfy $P(f_i, C|w_i, Int) \propto P(f_i, C) P(w_i|f_i, C, Int)$ according to the Bayesian rule, where $f_i$ may denote the corresponding observation function, C may denote the corresponding causal structure, $w_i$ may denote part of the grounding data 30g, and Int may denote intervention.

In one embodiment, the posterior probability $P(f_i, C|w_i)$ may be proportional to $P(f_i, C) P(w_i|f_i, C)$ or $\Pi_{t=0}^{T} P(w_{i,t}|s_{t-1}, C, f_i)^{(T-t)\cdot \gamma}$, where $s_{t-1}$ may denote the state at a time instant t−1, T may denote a current/present time instant, and γ may be 0.5 but is not limited thereto. In one embodiment, $P(w|f_i, C)$ may be $\Pi_{t=0}^{T} P(w_{i,t}|s_{t-1}, C, f_i)$. In one embodiment, $P(w_{i,t}|s_{t-1}, C, f_i)$ may be $$\frac{1}{|R_{s_t}|} \prod_{i=1}^{N} P(s_{i,t}|s_{t-1}, C)$$

or $\Sigma_{s_t} P(w_{i,t}|s_t, f_i) \Pi_{i=1}^{N\ P(s_{i,t}|s_{t-1}, C)}$, where $s_{i,t}$ may denote the state of the causal variable $cv_i$ at a time instant t, N may denote the total number of all causal variables (e.g., including the causal variables $cv_{(i-1)}$, $cv_i$, $cv_{(j-1)}$, and $cv_j$), N is a positive integer, and $R_{s_t}$ may denote the data amount of the data $w_i$ which is compatible with the state $s_i$ of the causal variable $cv_i$ within the grounding data 30g. In one embodiment, the present invention may select/find the causal variable $cv_i$ that minimizes the data amount $R_{s_t}$, such that data within the grounding data 30g which are frequently used (e.g., the data $w_i$) may be cut into finer pieces than those which are rarely used.

As set forth above, Bayesian probability mechanism may combine the number of causal variables (e.g., including the causal variables $cv_{(i-1)} cv_i$, $cv_{(j-1)}$ states of the causal variables, a causal structure of the causal variables, and observation functions for the causal variables (e.g., including the observation functions $f_{(i-1)}$, $f_i$, $f_{(j-1)}$, and $f_j$) and draw relevant joint inferences to explain/interpret the grounding data 30g, thereby creating the causal graph CG. The causal variables (e.g., including the causal variables $cv_{(i-1)}$, $cv_i$, $cv_{(j-1)}$, and $cv_j$) of the causal graph CG (or the number of the causal variables) and a causal structure (e.g., the causal structure C) are determined at the same time; therefore, the causal planning module 120P may differentiate (a) from (b) of FIG. 3, and vice versa.

As shown in FIG. 3, each causal variable (e.g., the causal variable $cv_i$) may correspond to an observation function (e.g., the observation function $f_i$). In one embodiment, an observation function (e.g., the observation function $f_i$) may be calculated/derived using a causal semantic generative (CSG) model so as to predict low-dimensional state attributes (e.g., attribute(s) of the state of the causal variable $cv_i$) from high-dimensional environmental variables (e.g., the grounding data 30g). Moreover, the causal semantic generative model may avoid deeming variation factor(s) cause(s) of a causal variable (e.g., the causal variable $cv_i$), and may correctly determine semantic factor(s) to be cause(s) of the causal variable. In one embodiment, the causal semantic generative model is primarily based on causal invariance principle and involves variational Bayes.

In one embodiment, the observation function $f_i$ may satisfy $s_{i,t} = f_i(w_{i,t})$. In one embodiment, the observation function $f_i$ may be implemented using multivariate Gaussian distribution: for example, the observation function $f_i$ may satisfy $$f_i(w_i, z) = N\left(\begin{pmatrix} w_i \\ z \end{pmatrix} \middle| \begin{pmatrix} \mu_{w_i} \\ \mu_z \end{pmatrix}, \Sigma\right).$$

Alternatively, the observation function $f_i$ may be related to $$N\left(\begin{pmatrix} w_i \\ z \end{pmatrix} \middle| \begin{pmatrix} \mu_{w_i} \\ \mu_z \end{pmatrix}, \Sigma\right),$$

where z may denote data (which does not contribute to the causal variable $cv_i$) within the grounding data 30g, $\mu_{wi}$, $\mu_v$ may denote means fixed as zero vectors, $\Sigma$ may be parameterized by Cholesky decomposition to satisfy, for example, $\Sigma = LL^T$. The matrix L may be a lower-triangular matrix with positive diagonals and may, for example, be parameterized to satisfy $$L = \begin{pmatrix} L_{w_i w_i} & 0 \\ M_{z w_i} & L_{zz} \end{pmatrix}.$$

Each of the matrixes $L_{w_i w_i}$, $L_{zz}$ may be smaller lower triangular matrixes. The matrix $M_{zwi}$ may be any arbitrary matrix. Each of the matrixes $L_{w_i w_i}$, may be parameterized by a summation of positive diagonal elements (guaranteed via an exponential map) and a lower triangular matrix (without positive diagonal elements).

In another embodiment, an observation function (e.g., the observation function $f_i$) may be calculated/derived using a deep learning model so as to predict low-dimensional state attributes (e.g., attribute(s) of the state of the causal variable $cv_i$) from high-dimensional environmental variables (e.g., the grounding data 30g). However, in addition to semantic factor(s), a deep learning model may misjudge variable factor(s) as cause(s) of a causal variable (e.g., the causal variable $cv_i$).

As shown in FIG. 1, the causal planning module 120P may include a finite domain representation (FDR) planning module 122FDR.

In step S204, the finite domain representation planning module 122FDR may utilize a constrained causal graph (e.g., the causal graph CG) to dynamically perform finite domain representation planning. In finite domain representation planning, preconditions define under which circumstances (e.g., state(s)) actions may be performed.

Actions may change state(s) and generate new state(s) (i.e., produce certain effect(s)), thereby eventually achieving certain goal state (e.g., a goal state sg). A solution of finite domain representation planning is a plan from an initial state (e.g., an initial state e0) to a goal state (e.g., the goal state sg) in a search space. In one embodiment, a solution of finite domain representation planning may be a directed graph.

Figure 4:
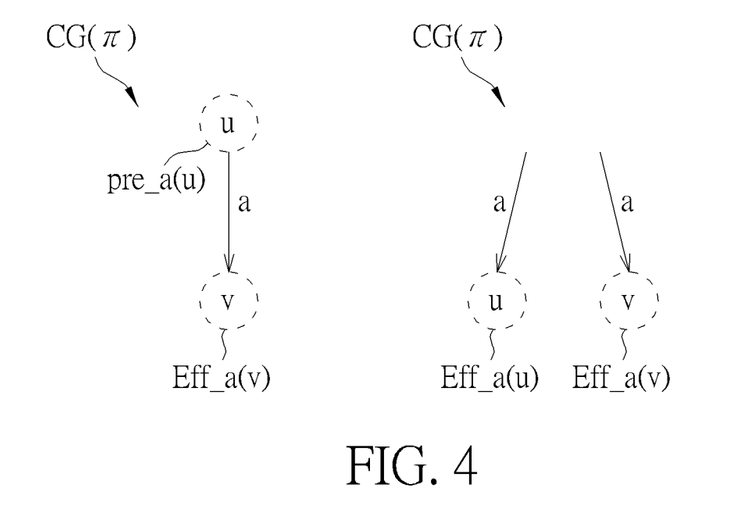
FIG. 4 is a schematic diagram of states and part of a causal graph according to an embodiment of the present invention.

In one embodiment, a finite domain representation planning task may be $\Pi=(V, A, c, I, G)$, where V may denote a finite set of state variables, A may denote a finite set of actions, and c may denote a loss function, I may denote an initial state, and G may denote a goal state. For example, FIG. 4 is a schematic diagram of states u, v and part of a causal graph CG ($\Pi$) according to an embodiment of the present invention. In FIG. 4, (a) and (b) respectively illustrate two possibilities of the causal graph CG(n). The causal graph CG ($\Pi$) of the finite domain representation planning task $\Pi$ may be a directed graph with vertices V and an arcs/paths (e.g., a path (u, v)) if the state u is not equal to the state v and there exists an action a satisfying $a \in A$ so that either "there exists $a \in A$ so that a precondition pre a (u) and an effect eff_a (v) are both defined", or "there exists $a \in A$ so that an effect eff_a (u) and the effect eff a (v) are both defined". There may be the path (u, v) between the states u and v. The precondition pre_a (u) may denote a (precondition) state of the vertex u (as a precondition) given the action a. The effect eff_a(v) may denote an (effect) state of the vertex v (as an effect) given the action a. In other words, in the present invention, a causal graph of the finite domain representation planning task $\Pi$ is a constrained causal graph. Constrained causal graphs may be optimized according to user scenarios to exclude other possibilities in the search space, thereby improving performance, reducing computation, and reducing power consumption.

In one embodiment, in step S204, after the constrained causal graph is constructed/created using the algorithm, the constrained causal graph may be converted/translated into a domain file of Planning Domain Description Library (PDDL) (i.e., description of system) to perform finite domain representation planning of the finite domain representation planning module 122FDR. In other words, a domain file of the present invention may not be defined manually/artificially (e.g., provided by experts).

In one embodiment, a domain file may be configured to describe action (s), and a problem file may be configured to describe an initial state and a goal state. In one embodiment, content of a domain file may include the following:

precond_1→action_1→effect_1
precond_2→action_2→effect 2
...
precond_n→action_n→effect_n States precond_1 to precond n may be used as preconditions. Action_1 to action n may be actions. States effect_1 to effect_n may be used as effects. Here, n is a positive integer. The state effect_i may happen after action_i acts on the state precond_i. In one embodiment, precond_i→action_i→effect_i may correspond to part of a causal graph (e.g., the causal graph CG or CG($\Pi$)). For example, in the causal graph CG ($\Pi$) shown in (a) of FIG. 4, the state u serving as a cause may correspond to a precondition precond_i, and the state v serving as an effect/result may correspond to an effect effect_i. In other words, a causal graph may present a structure of states and actions.

In one embodiment, the effect effect_1 may be a cause of the state precond_3, and the effect effect_3 may be a cause of the state precond_7. Accordingly, a solution of finite domain representation planning may at least include an (action) sequence of the actions action_1, action_3, action_7 but may not include, for example, the action action_2.

Figure 5:
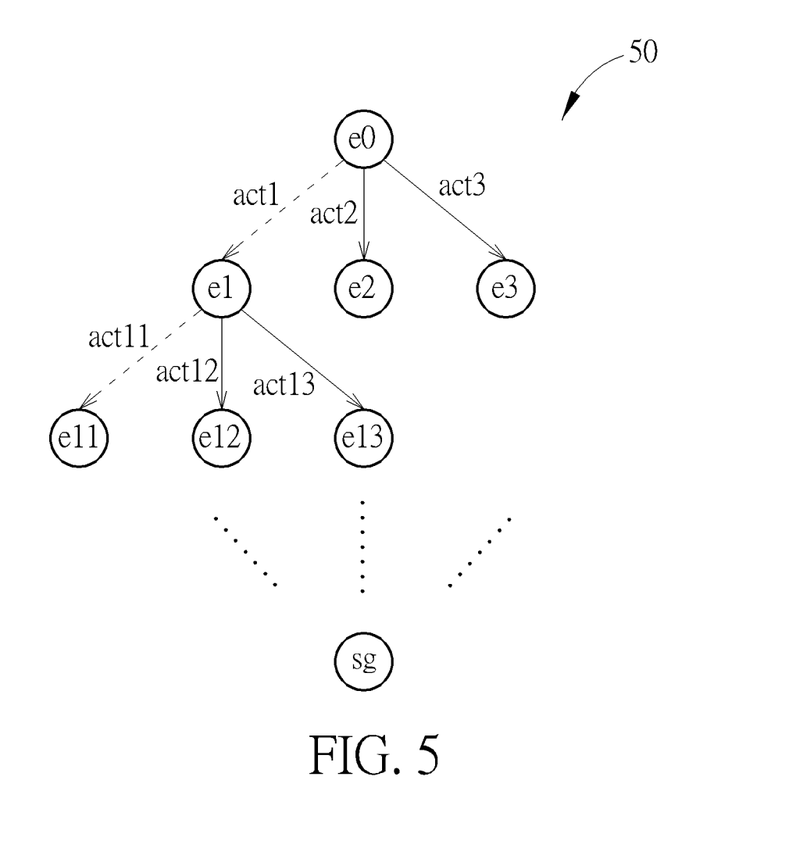
FIG. 5 is a schematic diagram of a planning tree according to an embodiment of the present invention.

For example, FIG. 5 is a schematic diagram of a planning tree 50 according to an embodiment of the present invention. When a planner of the finite domain representation planning module 122FDR reads a domain file, the planner may generate the planning tree 50 corresponding to the domain file (or the constrained causal graph). The planning tree 50 may be represented as a directed graph. Paths of the planning tree 50 (i.e., arrows in FIG. 5) are actions, and vertices of the planning tree 50 are states. Each state may be represented by a set of state variables, and each action may be represented by a function that maps sets of state variables. Paths may show dependencies of states. For an action act1, the initial state e0 may be used as a precondition and a state e1 may be used as an effect. In terms of an action act11, an effect of the action act1 (i.e., the state e1) may be used as a precondition, and a state e11 may be used as an effect. The planning tree 50 may serve as a search space. A solution of the finite domain representation planning module 122FDR may be an (ordered) sequence of actions in the planning tree 50 starting from the initial state e0 and ending at the goal state sg. For example, the branch of the action act1 is determined according to a current/present (environmental)

state to not be a solution of the finite domain representation planning module 122FDR, while the branches of actions act2 and act3 are determined to be a solution of the finite domain representation planning module 122FDR. However, the present invention is not limited to thereto.

In one embodiment, certain action(s) may be reversible, such that a past state (e.g., the state e11) may be achievable from a current/present state (e.g., the state e1). In one embodiment, a loop maybe formed between two adjacent states (e.g., the states e1, e11). In one embodiment, certain states (e.g., the state e11) may be nondeterministic states.

In one embodiment, the planner may perform a search using a search algorithm (such as best-first search, iterative deepening search, hill-climbing search, or greedy best-first search) to find a solution of the finite domain representation planning module 122FDR.

In step S204, the causal reasoning module 11 OR may provide the initial state e0 to the causal planning module 120P. The causal planning module 120P may use the initial state e0 as a starting point and rely on the constrained causal graph to perform finite domain representation planning.

As shown in FIG. 1, the causal reasoning module 110R may include a structural causal model (SCM) module 112SCM or a Bayesian network module 112B. In step S204, the causal reasoning module 110R may input a (generic) causal graph to the structural causal model module 112SCM or the Bayesian network module 112B so as to output the initial state e0. The causal reasoning module 110R may verify or process the (generic) causal graph according to a structural causal model or Bayesian network, then predict/infer a current/present state, and use the current/present state as the initial state e0 of the causal planning module 120P. In other words, as for how to determine the initial state e0, the present invention may use causal reasoning without constraining a causal graph. The present invention may use a structured causal model or Bayesian network to work with the generic causal graph and then predict (i.e., reason) a current/present state, which in turn is fed into the initial state of causal planning. A generic causal graph may be an unconstrained causal graph, but in another embodiment the generic causal graph may be a constrained causal graph.

In one embodiment, the causal reasoning module 110R may include/use/configure only one of the structural causal model module 112SCM and the Bayesian network module 112B. The other one of the structural causal model module 112SCM and the Bayesian network module 112B may be removed/absent from the causal reasoning module 110R.

In one embodiment, similar to the causal graph CG, the causal reasoning module 110R may obtain/derive the (generic) causal graph from the observation data 10b of the distributed unit 10DU (or data converted from the observation data 10b) based on maximum a posterior and point estimation.

Figure 6:
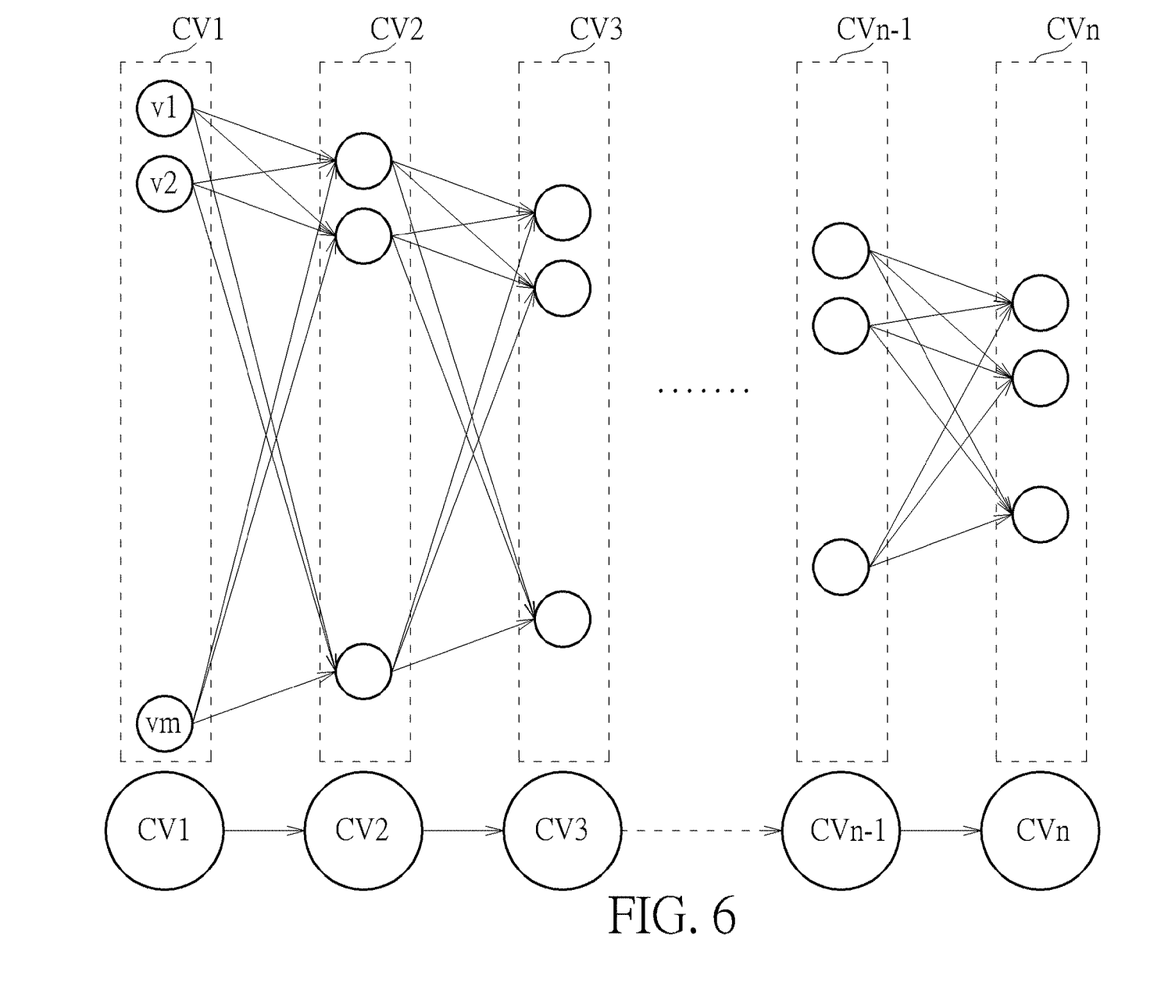
FIG. 6 is a schematic diagram of how to obtain/derive a (generic) causal graph using a deep learning model according to an embodiment of the present invention.

In one embodiment, the causal reasoning module 110R may obtain/derive the (generic) causal graph from the observation data 10b of the distributed unit 10DU (or the data converted from the observation data 10b) based on a deep learning model. For example, FIG. 6 is a schematic diagram of how to obtain/derive a (generic) causal graph using a deep learning model according to an embodiment of the present invention. The (generic) causal graph may include causal variables CV1 to CVn, where n is a positive integer. In FIG. 6, attributes v1 to vm of states may constitute the causal variable CV1 to forma feature vector, where m is a positive integer. The causal variable CV1 may correspond to an input layer of the deep learning model. The causal variables CV2 to CVn-1 are respectively outputs of hidden layers HD2 to HDn-1 of the deep learning model processed by activation function(s), each of which defines how the weighted sum of its corresponding input is transformed into its corresponding output from its corresponding node in the hidden layer and is used within or after the internal processing of its corresponding node. The causal variable CVn may be a predicted state, and the causal variable CVn may correspond to an output layer of the deep learning model. As shown in FIG. 6, the deep learning model presented at the top of FIG. 6 may correspond to the causal graph presented at the bottom of FIG. 6.

As set forth above, an algorithm of a software of the server 10SVR may be divided into causal reasoning and causal planning. In the causal reasoning, an initial state may be inferred or deduced from high-dimensional environmental variables. In the causal planning, the planning may be done according to the initial state, such that a current/present state may be considered. In the causal planning, the most feasible/optimized radio unit parameters may be planned or found.

In step S206, the causal reasoning module 110R may output the action data 10c to the distributed unit 10DU, such that the most feasible/optimized radio unit parameters may be set to the distributed unit 10DU. When the radio unit parameters are applied to the distributed unit 10DU, the distributed unit 10DU and the radio unit 10RU of different vendors may be integrated or cooperate coordinatedly.

In one embodiment, the action data 10c may include or be related to a solution of finite domain representation planning; for example, the action data 10c may include all actions in a solution of finite domain representation planning. In one embodiment, the action data 10c may include or be related to the most feasible/optimized radio unit parameters.

In one embodiment, after the most feasible/optimized radio unit parameters are set in the distributed unit 10DU in step S206, the radio unit parameters having been set may be manually fine-tuned, such that the radio unit parameters set in the distributed unit 10DU are the most optimal after testing, instead of only being the most optimal based on algorithmic judgments. When the radio unit parameters are set for the distributed unit 10DU, the distributed unit 10DU and the radio unit 10RU from a vender different from that of the distributed unit 10DU may be integrated and coordinated.

Figure 7:
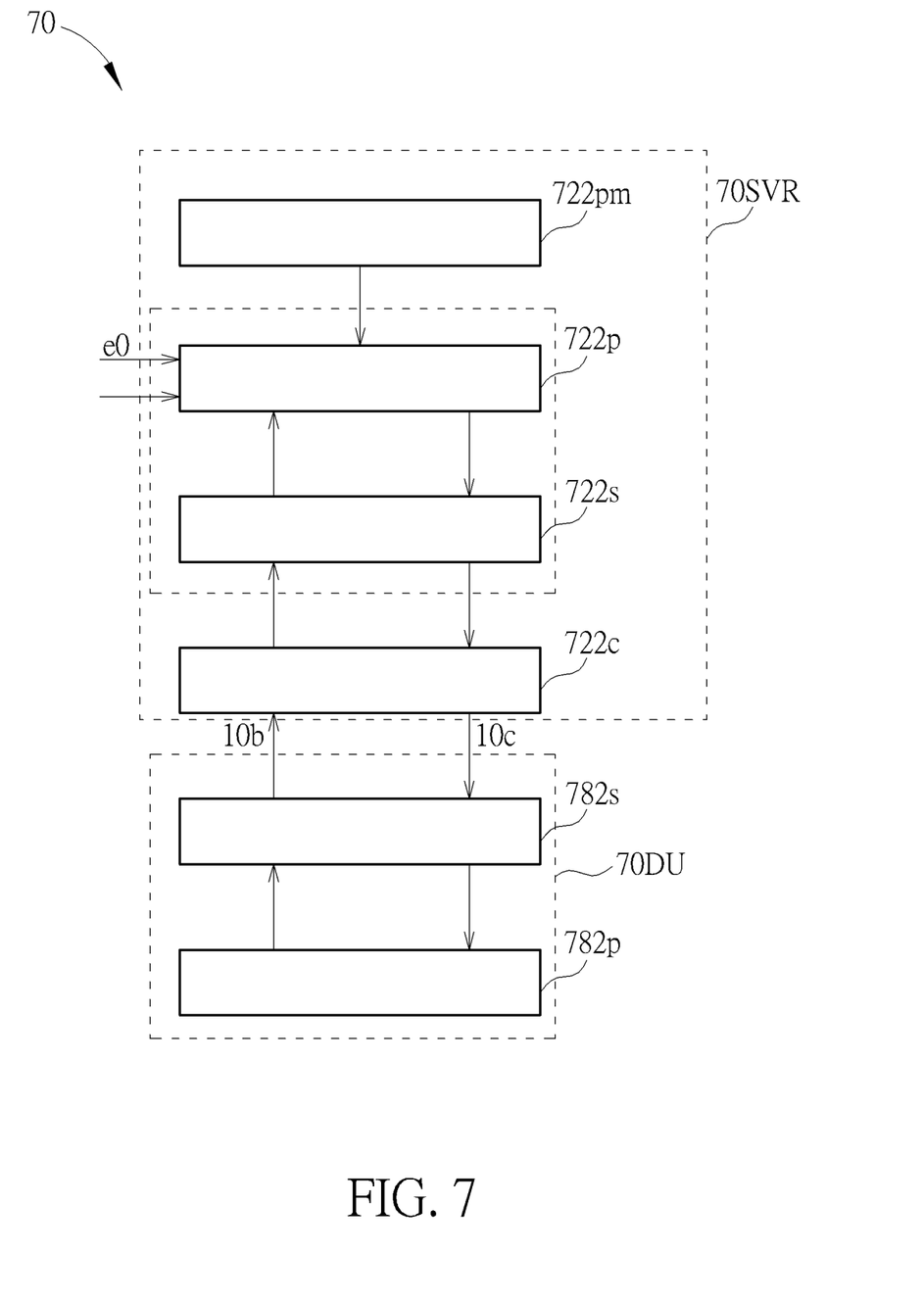
FIG. 7 is a schematic diagram of part of a communication system according to an embodiment of the present invention.

FIG. 7 is a schematic diagram of part of a communication system 70 according to an embodiment of the present invention. The communication system 70 may include a server 70SVR and a distributed unit 70DU.

The distributed unit 70DU may include an application module 782p and a system module 782s. The application module 782p may output signal(s) of event(s) to the system module 782s and receive command(s) from the system module 782s. The system module 782s may output the observation data 10b to the server 70SVR and receive the action data 10c from the server 70SVR.

The server 70SVR may include a controller 722c, a scheduler 722s, a planner 722p, and a policy maker module 722pm. The controller 722c may convert the observation data 10b having been received into an extensible markup language (XML) format, and output an execution status of the extensible markup language format to the scheduler 722s accordingly. The scheduler 722s may convert the extensible markup language format of variable length into a format of fixed length, and may output signal(s) of reactivity (e.g., grounding data 30g) to the planner 722p accordingly.

The planner 722p may output unscheduled plan(s) about what it/they may be to scheduler 722s according to the initial state e0, signal(s) of objective, the signal(s) of reactivity from the scheduler 722s, and description of system from the policy maker module 722pm. The scheduler 722s may output scheduled plan(s) about when and how it/they may be to the controller 722c accordingly.

In one embodiment, after the feasible/optimized radio unit parameters are set on the distributed unit 10DU in step S206 (or after the feasible/optimized radio unit parameters having be set in the distributed unit 10DU are manually fine-tuned), the planner 722p may determine whether to re-plan according to the signal (s) of reactivity. If the planner 722p determines that the radio unit parameters having been set need to be adjusted again, the server 70SVR may output the action data 10c which is adjusted to the distributed unit 70DU to reset the radio unit parameters in the distributed unit 70DU.

In one embodiment, an interface between a radio unit and a distributed unit may be an eCPRI interface, but is not limited thereto. For example, a CPRI interface may also be adopted.

In one embodiment, the server 10SVR may be an Oracle access manager (OAM) server.

In one embodiment, the storage circuit is configured to store image data or instructions. The storage circuit may be a subscriber identity module (SIM), a read-only memory (ROM), a flash memory, a random access memory (RAM), a disc read-only memory (CD-ROM/DVD-ROM/BD-ROM), a magnetic tape, a hard disk, an optical data storage device, a non-volatile storage device, a non-transitory computer-readable medium, but is not limited thereto.

In one embodiment, the processing circuit is configured to execute the instructions stored in the storage circuit. The processing circuit may be a central processing unit (CPU), a microprocessor, or an application-specific integrated circuit (ASIC), but is not limited thereto.

Table 1 lists part of interoperability testing (IOT) profiles. According to Table 1, it may be able to find which item(s) radio unit parameters may include/be, which open radio access network (O-RAN) specification section(s) the item(s) are related to, and which setting range(s) the item(s) may be within. However, radio unit parameters are not limited to those listed in Table 1. According to Table 1, the radio unit parameters may be constrained.

TABLE 1

| Item | Related O-RAN specification section (s) | possible setting range |
| --- | --- | --- |
| Network delay determination | 2.3.3 | Defined Transport Method |
| RU adaptation of delay profile information (based on DU delay profile and transport delay) | 2.3.3.2 | FALSE |
| DU timing advance type | 2.3.4-2.3.5, Annex B | Fixed Timing Advance |
| T1a_max_up | 2.3, Annex B | Less than or equal to 345 microseconds (us) |
| T1a_min_up | 2.3, Annex B | More than or equal to 294 us |
| T2a_max_up | 2.3, Annex B | More than or equal to 345 us |
| T2a_min_up | 2.3, Annex B | Less than or equal to 134 us |
| Tcp_adv_dl | 2.3.2, Annex B | 125 us |

TABLE 1-continued

| Item | Related O-RAN specification section (s) | possible setting range |
| --- | --- | --- |
| Ta3_max_up | 2.3, Annex B | Less than or equal to 171 us |
| Ta3_min_up | 2.3, Annex B | More than or equal to 50 us |
| Ta4_max_up | 2.3, Annex B | More than or equal to 331 us |
| Ta4_min_up | 2.3, Annex B | Less than or equal to 50 us |
| T1a_max_cp_ul | 2.3.2-2.3.3, Annex B | Less than or equal to 336 us |
| T1a_min_cp_ul | 2.3.2-2.3.3, Annex B | More than or equal to 285 us |
| T2a_max_cp_ul | 2.3.2-2.3.3, Annex B | More than or equal to 336 us |
| T2a_min_cp_ul | 2.3.2-2.3.3, Annex B | Less than or equal to 125 us |
| T12_max | 2.3, Annex B | 160 us |
| T12_min | 2.3, Annex B | 0 us |
| T34_max | 2.3, Annex B | 160 us |
| T34_min | 2.3, Annex B | 0 us |
| Non-delay managed U-Plane traffic | 2.3.6 | FALSE |

To sum up, to avoid the inefficiency and high error rate of manually setting the radio unit parameters, the present invention may reason a current/present state and plan actions that should be taken to set radio unit parameters on a distributed unit in an optimal way, instead of applying radio unit parameters manually.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optimization method, for a 5th generation (5G) mobile network system comprising a server, a distributed unit communicatively coupled to the server, and a radio unit communicatively coupled to the distributed unit, wherein the optimization method comprises:

receiving, by the server, observation data from the distributed unit;

generating, by the server, a constrained causal graph according to the observation data received from the distributed unit, wherein a number of a plurality of causal variables of the constrained causal graph and a causal structure of the constrained causal graph are determined together, wherein a plurality of posterior probabilities of respectively assigning a plurality of data of grounding data to a plurality of observation functions and the causal structure of the constrained causal graph are maximized to generate the constrained causal graph, one of the plurality of posterior probabilities is proportional to $\Pi_{t=0}^{T} P(w_{i,t}|s_{t-1}, C, f_i)^{(T-t)-\gamma}$, where $w_{i,t}$ denotes first data of the plurality of data at a time instant t, $s_{t-1}$ denotes at least one state at a time instant t−1, C denotes the causal structure, $\beta_i$ denotes a first observation function of the plurality of observation functions, T denotes a current time instant, and $\gamma$ is a real number, the first data and the first observation function are corresponding to a first causal variable of the plurality of causal variables;

performing, by the server, finite domain representation planning using the constrained causal graph to generate action data related to a plurality of radio unit parameters having been optimized for the radio unit and the distributed unit;

outputting, by the server, the action data to the distributed unit;

setting, by the distributed unit, the plurality of radio unit parameters according to the action data; and cooperating, by the distributed unit, with the radio unit according to the plurality of radio unit parameters having been set, wherein the cooperating occurs over an eCPRI or CPRI interface.

2. The optimization method of claim 1, wherein the step of generating the constrained causal graph according to the observation data received from the distributed unit comprises:

converting the observation data into the grounding data; and generating the constrained causal graph from the grounding data based on maximum a posteriori and point estimation.

3. The optimization method of claim 2, wherein the step of generating the constrained causal graph from the grounding data based on maximum a posteriori and point estimation comprises:

mapping the plurality of data in the grounding data to a plurality of causal variables of the constrained causal graph using the plurality of observation functions, wherein $\gamma$ is equal to 0.5.

4. The optimization method of claim 3, wherein the plurality of observation functions are obtained based on a causal semantic generative model.

5. The optimization method of claim 2, wherein the observation data is first converted into an extensible markup language format and then converted into the grounding data.

6. The optimization method of claim 1, wherein the step of performing the finite domain representation planning using the constrained causal graph comprises:

converting the constrained causal graph into a domain file of a planning domain description library to perform the finite domain representation planning.

7. The optimization method of claim 6, wherein a cause in the constrained causal graph corresponds to a precondition of an action in the domain file, and an effect instigated by the cause corresponds to an effect of the action in the domain file.

8. The optimization method of claim 1, wherein the step of performing the finite domain representation planning using the constrained causal graph comprises:

performing the finite domain representation planning using an initial state and the constrained causal graph.

9. The optimization method of claim 8, wherein the initial state is generated from another causal graph according to a structural causal model or a Bayesian network.

10. A server, for a 5th generation (5G) mobile network system, communicatively coupled to a distributed unit, wherein a radio unit communicatively coupled to the distributed unit, and the server comprises:

a storage circuit, configured to store instructions of:

receiving observation data from the distributed unit;

generating a constrained causal graph according to the observation data received from the distributed unit, wherein a number of a plurality of causal variables of the constrained causal graph and a causal structure of the constrained causal graph are determined together, wherein a plurality of posterior probabilities of respectively assigning a plurality of data of grounding data to a plurality of observation functions and the causal structure of the constrained causal graph are maximized to generate the constrained causal graph, one of the plurality of posterior probabilities is proportional to $\Pi_{t=0}^{T} P(w_{i,t}|s_{t-1}, C, f_i)^{(T-t)-\gamma}$, where $w_{i,t}$ denotes first data of the plurality of data at a time instant t, $s_{t-1}$ denotes at least one state at a time instant t−1, C denotes the causal structure, $\beta_i$ denotes a first observation function of the plurality of observation functions, T denotes a current time instant, and $\gamma$ is a real number, the first data and the first observation function are corresponding to a first causal variable of the plurality of causal variables;

performing finite domain representation planning using the constrained causal graph to generate action data related to a plurality of radio unit parameters having been optimized for the radio unit and the distributed unit; and outputting the action data to the distributed unit, wherein the distributed unit sets the plurality of radio unit parameters according to the action data, and the distributed unit cooperates with the radio unit according to the plurality of radio unit parameters having been set, wherein the cooperating occurs over an eCPRI or CPRI interface; and a processing circuit, coupled to the storage device, configured to execute the instructions stored in the storage circuit.

11. The server of claim 10, wherein the instruction of generating the constrained causal graph according to the observation data received from the distributed unit comprises:

converting the observation data into the grounding data; and generating the constrained causal graph from the grounding data based on maximum a posteriori and point estimation.

12. The server of claim 11, wherein the instruction of generating the constrained causal graph from the grounding data based on maximum a posteriori and point estimation comprises:

mapping the plurality of data in the grounding data to a plurality of causal variables of the constrained causal graph using the plurality of observation functions, wherein $\gamma$ is equal to 0.5.

13. The server of claim 12, wherein the plurality of observation functions are obtained based on a causal semantic generative model.

14. The server of claim 11, wherein the observation data is first converted into an extensible markup language format and then converted into the grounding data.

15. The server of claim 10, wherein the instruction of performing the finite domain representation planning using the constrained causal graph comprises:

converting the constrained causal graph into a domain file of a planning domain description library to perform the finite domain representation planning.

16. The server of claim 15, wherein a cause in the constrained causal graph corresponds to a precondition of an action in the domain file, and an effect instigated by the cause corresponds to an effect of the action in the domain file.

17. The server of claim 10, wherein the instruction of performing the finite domain representation planning using the constrained causal graph comprises:

performing the finite domain representation planning using an initial state and the constrained causal graph.

18. The server of claim 17, wherein the initial state is generated from another causal graph according to a structural causal model or a Bayesian network.

* * * * *